United States Patent
Morrison et al.

(10) Patent No.: US 6,883,091 B2
(45) Date of Patent: Apr. 19, 2005

(54) REDUCING BOOT TIMES VIA INTRUSION MONITORING

(75) Inventors: John A. Morrison, Ft. Collins, CO (US); Michael S Allison, Fort Collins, CO (US); Leo J Embry, Fort Collins, CO (US); Stephen Silva, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 09/871,329

(22) Filed: May 30, 2001

(65) Prior Publication Data

US 2002/0184483 A1 Dec. 5, 2002

(51) Int. Cl.[7] .............................................. G06F 9/445
(52) U.S. Cl. .................. 713/2; 713/1; 713/2; 713/100; 340/541; 379/44; 348/152; 361/635; 361/636; 361/637; 361/640
(58) Field of Search ................................ 713/1, 2, 100; 340/541; 379/44; 348/152; 361/635–637, 640

(56) References Cited

U.S. PATENT DOCUMENTS

| | | | | |
|---|---|---|---|---|
| 5,564,054 A | * | 10/1996 | Bramnick et al. | 713/2 |
| 5,745,669 A | * | 4/1998 | Hugard et al. | 714/3 |
| 6,098,158 A | * | 8/2000 | Lay et al. | 711/162 |
| 6,191,503 B1 | * | 2/2001 | Kitten et al. | 307/112 |
| 6,374,353 B1 | * | 4/2002 | Settsu et al. | 713/2 |
| 6,388,574 B1 | * | 5/2002 | Davis et al. | 340/568.1 |
| 6,393,560 B1 | * | 5/2002 | Merrill et al. | 713/2 |
| 6,434,696 B1 | * | 8/2002 | Kang | 713/2 |
| 6,434,697 B1 | * | 8/2002 | Leyda et al. | 713/2 |
| 6,519,698 B1 | * | 2/2003 | Leyda et al. | 713/2 |
| 6,598,159 B1 | * | 7/2003 | McAlister et al. | 713/2 |
| 6,640,316 B1 | * | 10/2003 | Martin et al. | 714/36 |
| 6,671,802 B1 | * | 12/2003 | Ott | 713/100 |
| 6,718,461 B1 | * | 4/2004 | Ewertz | 713/1 |
| 6,721,881 B1 | * | 4/2004 | Bian et al. | 713/1 |
| 6,721,885 B1 | * | 4/2004 | Freeman et al. | 713/2 |
| 6,725,368 B1 | * | 4/2004 | Liebenow | 713/2 |
| 6,732,264 B1 | * | 5/2004 | Sun et al. | 713/2 |
| 6,754,817 B1 | * | 6/2004 | Khatri et al. | 713/1 |
| 2001/0039612 A1 | * | 11/2001 | Lee | 713/2 |

* cited by examiner

*Primary Examiner*—Lynne H. Browne
*Assistant Examiner*—Nitin Patel
(74) *Attorney, Agent, or Firm*—Alexander J. Neudeck

(57) ABSTRACT

The time required to boot a computer is reduced by reducing or eliminating the need to discover many or all devices within the computer and the machine topology. Access panels are monitored so that it is detected when they are opened. For the access panels that have not been opened, it is assumed that the system configuration, topology, devices, etc. have not changed since the last boot process and there is no need to spend time discovering these devices and machine topology. Stored, instead of discovered, configuration information is then used to configure these devices. This reduces the time required to boot since discovery of devices is not performed. A service processor or other logic may be used to detect which access panels are opened. Also, only those elements of the configuration that may be affected by the particular access panels that were opened need to be re-discovered.

14 Claims, 1 Drawing Sheet

REDUCING BOOT TIMES VIA INTRUSION MONITORING

FIELD OF THE INVENTION

This invention relates generally to computer firmware or operating systems and more particularly to shortening computer boot-up time.

BACKGROUND OF THE INVENTION

During the boot process of many computer systems, the firmware or operating system spends time discovering the amount of memory, configuring memory, walking I/O busses to discover devices (LAN, PCI, SCSI, I2C, etc.), configuring devices, and discovering and configuring the machines topology. Unfortunately, these tasks may take a long time since the firmware or operating system must instruct the computer to probe many addresses and compare many of the results against a relatively large database of device characteristics just to complete the discovery portions of these tasks.

The length of time these tasks take impacts the overall length of time it takes to boot. Slow boot times may aggravate users and increase the time upgrades requiring a reboot take to complete. Slow boot times may also give a user the impression that the computer system is slow or is of inferior speed.

Accordingly, there is a need in the art for methods and apparatus that reduce the boot times of computer systems.

SUMMARY OF THE INVENTION

The invention reduces the time it takes to complete a boot process by reducing or eliminating the need to discover many or all of the devices and machine topology. When the computer is in standby, access panels are monitored so that it is detected when they are opened. If an access panel has not been opened, then it is assumed that the system configuration, devices, etc. that may have been affected by access into that component have not changed since the last boot process and there is no need to spend time discovering devices and machine topology that may have been changed by access to that panel. Stored, instead of discovered, configuration information is then used to configure those devices. This reduces the time required to boot since discovery is not performed on all of the devices in the computer. A service processor or other logic may be used to detect which access panels are opened. Also, those elements of the configuration that may have changed by the particular access panels that were opened are re-discovered and that information may be stored for future use during future computer boot-ups.

Other aspects and advantages of the invention will become apparent from the following detailed description, taken in conjunction with the accompanying drawings, illustrating by way of example the principles of the invention.

DETAILED DESCRIPTION OF THE PREFERRED EMBODIMENTS

Figure 1:
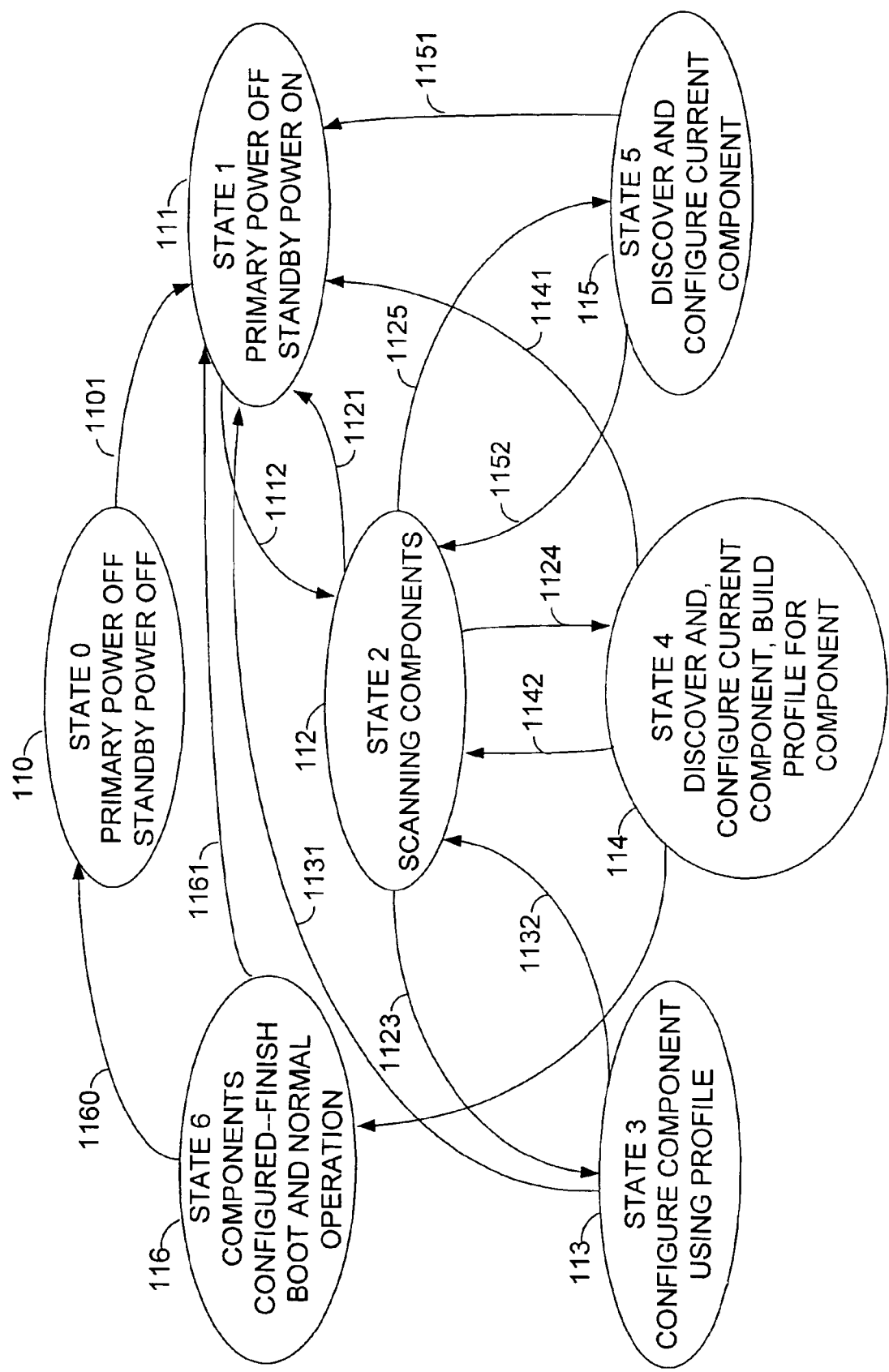
FIG. 1 is a state transition illustration illustrating a state machine that is an example implementation of reduced time boot-ups.

FIG. 1 is a state transition illustration illustrating a state machine that is an example implementation of reduced time boot-ups. The state of the system is determined by the state of the system power supplies and two sets of variables COMPONENTS and INTRUSIONS. COMPONENTS represents a set of subsystems or devices that require discovery and configuration. Thus, there is a member in the set COMPONENTS for each subsystem or device that has been discovered or is known to inherently exist in the system. Each member of the set COMPONENTS may have three values: 1) NO_INTRU_SUPPORT for a component that does not support intrusion detection or must be re-detected and re-configured during every boot regardless of any changes to the system; 2) INTRU_AND_NOTVALID for a component that does supports intrusion detection but does not have a valid profile associated with it, or, 3) INTRU_AND_VALID for a component that supports intrusion detection and has a valid profile associated with it. Hereinafter, an individual and arbitrary member of the set COMPONENTS may be referred to as COMPONENT_x.

INTRUSIONS represents a set of flags that signal intrusion detection for the elements in the COMPONENTS set that support intrusion detection. Each member of the set INTRUSIONS can be either asserted or deasserted. Asserted meaning that either an intrusion has occurred on the corresponding component in COMPONENTS, or it is not known if an intrusion has occurred or not occurred. A member of INTRUSIONS being deasserted means that no intrusion has occured into the corresponding component. Thus each element in the set INTRUSIONS corresponds to an element in COMPONENTS that supports intrusion detection. Hereinafter, an individual and arbitrary member of the set INTRUSIONS may be referred to as INTRUSION_y.

In FIG. 1, State 0 110 represents total system shutdown with no power to the system. This includes no power to both the main system and any standby power that may preserve the variables storing the members of the set INTRUSIONS and the variable storing the members of the set COMPONENTS variables, and any logic or service processor that can detect intrusions.

State 1 111 represents the situation when the standby power is on and the primary system power is off. When standby power is on it allows a service processor or other logic to monitor intrusions into access panels. Accordingly, State 1 111 is reached from State 0 110 by transition 1101 when system standby power is turned on.

In FIG. 1, when standby power is turned on a transition from State 0 110 to State 1 111 via transition 1101 is made and all the members of INTRUSIONS are asserted. This will force a complete scan of all components to take place during the boot process since nothing will be assumed about the physical characteristics or state of the computer.

When primary system power is turned on a transition from State 1 111 transitions to State 2 112 via transition 1112 is made and a first member of COMPONENTS, COMPONENT_x, corresponding to the Base Component is created. The value of COMPONENT_x is set to either INTRU_AND_NOTVALID or NO_INTRU_SUPPORT depending upon whether the Base Component supports intrusion detection or not, respectively. The Base Component is simply the first element listed in the set of components COMPONENTS and may be the main chassis or other major component that houses a group of devices or other components.

State 2 112 represents the central loop point of the component intrusion scan where the process considers each member of COMPONENTS. From State 2 112, there may be a transition to either States 3 113, 4 114 or 5 115 or to State 6 116 when there are no more components to consider.

At the systems first power-up, however, (i.e. after an initial transition from State 0 110 to State 1 111 to State 2 112) all of the members of INTRUSIONS are asserted and there is only one member in the set COMPONENTS. This is the Base Component and the value of the member of COMPNENTS corresponding to the Base Component is set to either NO_INTRU_SUPPORT or INTRU_AND_NOTVALID. Accordingly, the next transition out of State 2 112 is to either State 5 115 via transition 1125 or to State 4 114 via transition 1124. A transition to State 5 115 via transition 1125 is made if the Base Component does not support intrusion detection (because the member of COMPONENTS corresponding to the Base Component equals NO_INTRU_SUPPORT). A transition to State 4 114 via transition 1124 is made if the Base Component supports intrusion detection (because the member of COMPONENTS corresponding to the Base Component equals INTRU_AND_NOTVALID).

If a transition to State 5 115 (via transition 1125) is made, full discovery and configuration code is executed for the Base Component. This may result in additional components being discovered. When additional components are discovered, additional elements are added to the set COMPONENTS and their values set to NO_INTRU_SUPPORT, INTRU_AND_NOTVALID, and INTRU_AND_VALID according to what was discovered or already known about them. Once this process is complete the Base Component is fully configured. A transition to State 2 112 (via transition 1152) is then made and another member of COMPONENTS is made the current component for consideration in State 2 112.

If a transition to State 4 114 (via transition 1124) is made, then discovery and configuration code is executed for the Base Component and a valid profile for the Base Component is built. This also may result in additional components being discovered. When additional components are discovered, additional elements are added to the set COMPONENTS and their values set to NO_INTRU_SUPPORT, INTRU_AND_NOTVALID, and INTRU_AND_VALID according to what was discovered or already known about them. A transition to State 2 112 (via transition 1142) is then made and another member of COMPONENTS is made the current component for consideration in State 2 112.

Once back in State 2 112, after returning from State 4 114 or State 5 115, a component other than the Base Component is now the current component (provided new components have been discovered in either State 4 114 or State 5 115). The next transition out of State 2 112 is to either State 5 115 via transition 1125 or to State 4 114 via transition 1124 because all the members of INTRUSIONS were asserted in during transition 1102 and have not yet been deasserted. In State 4 114 or State 5 115, discovery, configuration, and possibly profile building for the current component takes place. Therefore, upon returning from either of these states, new components may have been added to COMPONENTS. Also, another member of COMPONENTS that has not been the current member (if any) will have been selected as the current component. This process repeats itself for each member in or added to COMPONENTS until there are no more components in need of discovery and configuration. When there are no more components in need of discovery and configuration, a transition to State 6 116 via transition 1126 is made. In State 6 116, the boot process is completed and then followed by normal operation.

A transition out of State 6 116 is made when one or both of the power supplies are switched off. If both primary system power and standby power are turned off, then a transition back to State 0 110 via transition 1106 is made. If only the primary system power is turned off, a transition to State 1 111 via transition 1161 is made and all the members of INTRUSIONS are deasserted. While the system is in State 1 111, access panels may be opened and various components added or removed. When an access panel is opened, this event is noted by the service processor or other logic and the appropriate member of INTRUSIONS is asserted.

When primary system power is once again turned on a transition from State 1 111 transitions to State 2 112 via transition 1112 is made and the current component is set to the member of COMPONENTS corresponding to the Base Component. From State 2 112, there may be a transition to either State 3 113, State 4 114 or State 5 115 depending upon the value of the current member of COMPONENTS and the value of the member of INTRUSIONS corresponding to that member, or to State 6 116 when there are no more components to consider. The transitions from State 2 112 to State 4 114, State 5 115, and State 6 116 were described, above.

If a valid profile for the current component exists, and the current component supports intrusion detection (i.e. COMPONENT_x is set to INTRU_AND_VALID) and the corresponding member of INTRUSIONS is deasserted for this component, then a transition from State 2 112 to State 3 113 is made via transition 1123. In State 3 113, the current component is initialized and configured using the stored profile that was created for it in State 4 114. After this is complete, a transition from State 3 113 back to State 2 112 (via transition 1132) is made and another member of COMPONENTS that has not been the current member (if any) is selected as the current component. Note that no discovery is done in State 3 113. This helps speed the boot process.

The process of transitioning out of State 2 112 to either State 3 113, State 4 114, or State 5 115 repeats itself for each member in or added to COMPONENTS until there are no more components in need of discovery, initialization, or configuration. When there are no more components in need of discovery, initialization, or configuration, a transition to State 6 116 via transition 1126 is made. In State 6 116, the boot process is completed and then followed by normal operation.

In a typical system, the code executed in State 3 113 completes in less time than the code executed for the same component in either State 4 114 or State 5 115 because the code executed in State 3 113 is able to configure the component using stored profile information instead of having to execute additional code to discover information about the component. Accordingly, once there are stored profiles for one or more components, and none of the access panels have been opened (which may cause a change in one or more stored profiles) the boot time is reduced. Since many computer boot-ups are for reasons that do not require opening of access panels, these boot-ups may occur significantly faster.

In addition to the transitions described above, State 1 111 may be reached from State 2 112, State 3 113, State 4 114, or State 5 115 by transitions 1121, 1131, 1141, 1151 which represent the case when primary power is turned off and standby power is turned on during those states. Likewise, but not shown in FIG. 1, State 0 may be reached from any other state when primary power and standby power are both switched off.

Although a specific embodiment of the invention has been described and illustrated, the invention is not to be limited to the specific forms or arrangement so described and illustrated. The invention is limited only by the claims.

What is claimed is:

1. A method of booting a computer, comprising:

determining whether power to an intrusion monitor was removed before said booting;

if said power was removed, configuring a first hardware component from information discovered about said first hardware component;

if said power was not removed, testing for an intrusion into an access panel associated with a first hardware component using said intrusion monitor and configuring said first hardware component from a stored profile if an intrusion was not detected.

2. The method of claim 1, further comprising:

if said power was not removed, constructing a profile for said first hardware component if an intrusion was detected and storing said profile for said first hardware component.

3. The method of claim 1, further comprising:

configuring a second component from information discovered about said component.

4. The method of claim 3 wherein said information is discovered regardless of detection of an intrusion into said second component.

5. A computer system, comprising:

a chassis intrusion detection system;

a main tower supply;

a standby power supply that powers said chassis intrusion detection system; and, a state machine that configures a component of said computer system from a stored profile of said component if said chassis intrusion detection system indicates that said component has not been altered since said computer system was last booted and configures said component from information discovered about said component if said chassis intrusion detection system indicates that said component may have been altered, wherein when said main power supply and said standby power supply have both turned off since said computer system was last booted, said state machine configures said component from said discovered information.

6. The computer system of claim 5 wherein said chassis intrusion detection system comprises a service processor.

7. The computer system of claim 6 wherein said chassis intrusion detection system comprises switches coupled to said service processor whereby the state of at least one of said switches indicate when at least one access panel on a chassis of said computer system is open.

8. A program storage medium readable by a computer, tangibly embodying a program of instructions executable by the computer to perform method steps for booting a computer, said method steps comprising:

reading an indicia that indicates whether a change may have been made to a hardware component, wherein said indicia corresponds to whether an access panel has been opened and to whether main and standby power have been turned off;

discovering information about said hardware component if said indicia indicates that a change may have been made to said component or that main and standby power have been turned off, and configuring said hardware component based upon said discovered information; and, configuring said hardware component based upon stored information if said indicia indicates a change has not been made to said hardware component.

9. The program storage medium of claim 8 wherein a service processor that operates on standby power generates said indicia.

10. The program storage medium of claim 8 wherein a main processor communicates with said service processor to read said indicia.

11. A method of booting a computer, comprising:

determining whether a first access panel and a second access panel have been opened since a last boot process;

discovering information about at least one first hardware component that is accessed via said first access panel if said first access panel was opened since said last boot process;

discovering information about at least one second hardware component that is accessed via said second access panel if said second access panel was opened since said last boot process;

reading said information about said at least one first hardware component from a first stored profile if said first access panel was not opened since said last boot process;

reading said information about said at least one second hardware component from a second stored profile if said second access panel was not opened since said last boot process;

configuring said at least one first hardware component based on said information about said at least one first hardware component; and configuring said at least one second hardware component based on said information about said at least one second hardware component.

12. The method of claim 11, further comprising updating said first stored profile with said information discovered about said at least one first hardware component if said first access panel was opened since said last boot process.

13. The method of claim 11, further comprising updating said second stored profile with said information discovered about said at least one second hardware component if said second access panel was opened since said last boot process.

14. The method of claim 11, further comprising determining if power was removed from an intrusion monitor for said first and second access panels since said last boot process, and if so, discovering said information about said at least one first and second hardware components, configuring said at least one first and second hardware components based on said information, and updating said first and second stored profiles with said information.

* * * * *